United States Patent [19]

Dudley

[11] 4,072,967
[45] Feb. 7, 1978

[54] STEREOSCOPIC PROJECTION MICROSCOPY

[76] Inventor: Leslie Peter Dudley, 11088 Ophir Drive, No. 307, Los Angeles, Calif. 90024

[21] Appl. No.: 683,191

[22] Filed: May 4, 1976

[51] Int. Cl.² ............................................. G03B 21/00
[52] U.S. Cl. ................................. 354/79; 354/112; 353/7; 353/8; 353/39; 350/132
[58] Field of Search ................... 354/77, 79, 103, 104, 354/112, 113, 114, 115, 116, 117; 353/7, 8, 39; 350/132, 141

[56] References Cited

U.S. PATENT DOCUMENTS

| 2,669,901 | 2/1954 | Rehorn | 353/8 |
| 3,240,112 | 3/1966 | Erban | 353/39 |
| 3,515,460 | 6/1970 | Baluteau et al. | 354/103 |
| 3,653,748 | 4/1972 | Athey | 354/103 |
| 3,663,085 | 5/1972 | Davis | 350/132 |
| 3,712,199 | 1/1973 | Songer | 350/132 |
| 3,827,793 | 8/1974 | Dudley | 354/112 X |
| 3,894,802 | 7/1975 | Higgins | 350/132 |
| 3,964,818 | 6/1976 | Humphrey | 353/7 |
| 3,984,186 | 10/1976 | Momose et al. | 354/79 |

Primary Examiner—L. T. Hix
Assistant Examiner—Alan Mathews
Attorney, Agent, or Firm—Keith D. Beecher

[57] ABSTRACT

An improved system is provided for converting monocular microscopes to the stereoscopic mode with the aid of polarizing filters or color filters. The embodiment of the system illustrated herein includes means by which the specimen under examination can be viewed by stereo projection. The system may include means by which stereo photomicrography on black-and-white or color film can be easily and effectively accomplished; and it may include means for transmitting stereo microscopic images by television.

10 Claims, 2 Drawing Figures

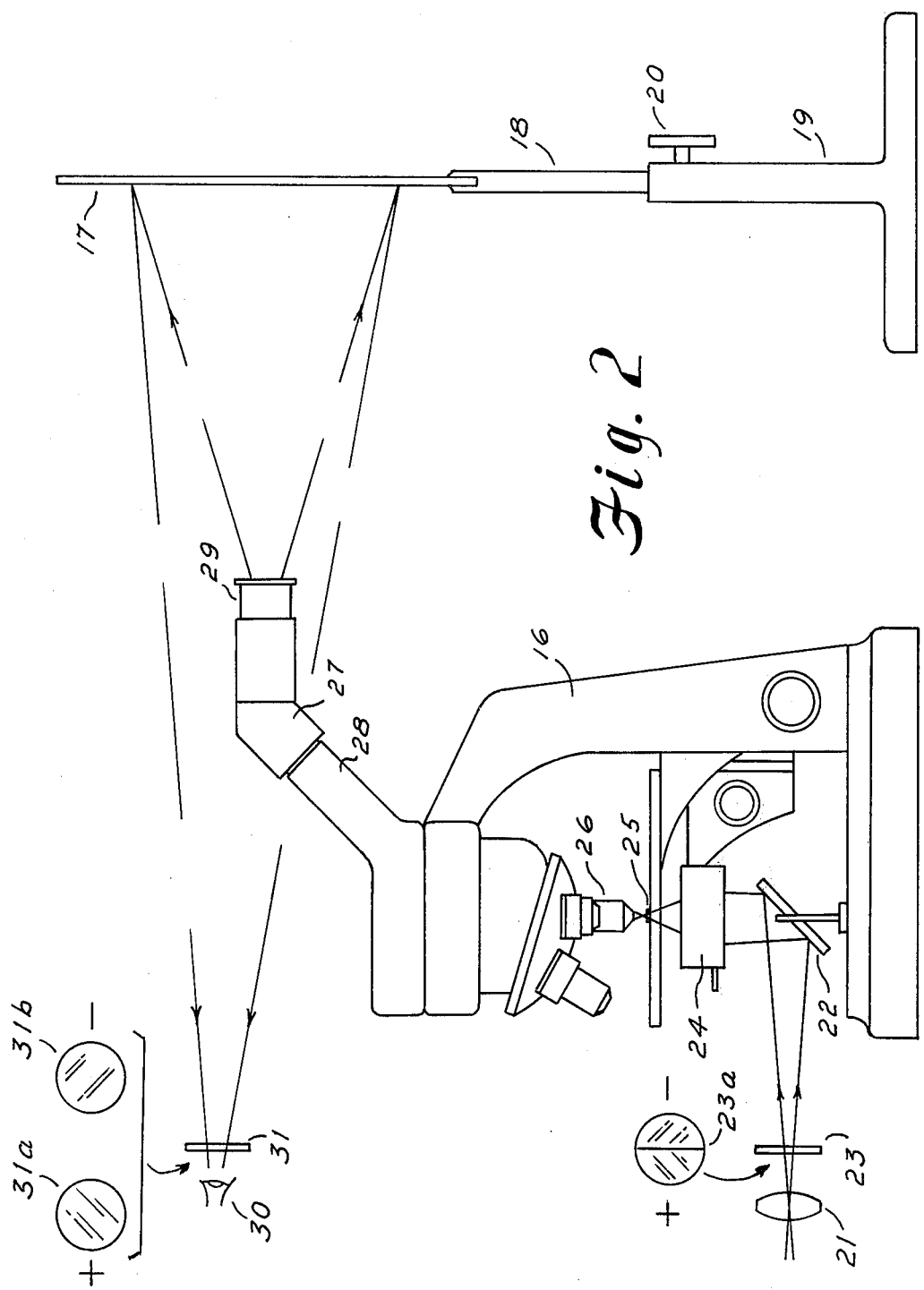

STEREOSCOPIC PROJECTION MICROSCOPY

BACKGROUND OF THE INVENTION

The system forming the subject matter of this application is of the same general type as the system disclosed in my U.S. Pat. 3,827,793 which issued Aug. 6, 1974. A system of stereoscopic projection microscopy is disclosed in the patent comprising the following elements: a monocular microscope the objective of which is provided with beam-splitting complementary filters at the exit pupil for the purpose of producing a pair of disparate images of the specimen under examination; a light source for illuminating the specimen; a screen on which the projected images are materialized, and a pair of spectacles for use in viewing the projected images, the eyepieces of the spectacles embodying complementary filters corresponding with those in the objective in a manner such that only one of the two disparate images is visible to the observer's left eye, while only the other image is visible to his right eye. The beam-splitting filters and the filters incorporated in the spectacles may be of either the complementary color type or the polarizing type.

The system described in the patent, although yielding good results, suffers from the disadvantage that resolution of the images is reduced by the presence of the beam splitter in the objective. This reduction in resolution is the combined effect of three main causes: First, the location of the beam splitter is such that the numerical aperture of the objective is reduced; second, owing to the fact that the beam splitter is necessarily of some finite thickness, refraction and scattering of the incident rays occurs; third, as it is impossible to make an optically perfect junction between the two halves of the beam splitter, some internal reflection and scattering inveitably occurs at the line (surface) of demarcation.

One of the objects of the present invention is to provide means by which the reduction in resolution due to the above causes is avoided. Other features of the invention will become evident later in the specification.

BRIEF DESCRIPTION OF THE DRAWINGS

FIG. 2 shows a monocular microscope and ancillary equipment for use in stereo projection in accordance with a feature of the invention.

DETAILED DESCRIPTION OF THE INVENTION

(1) Stereo Projection

Figure 1:
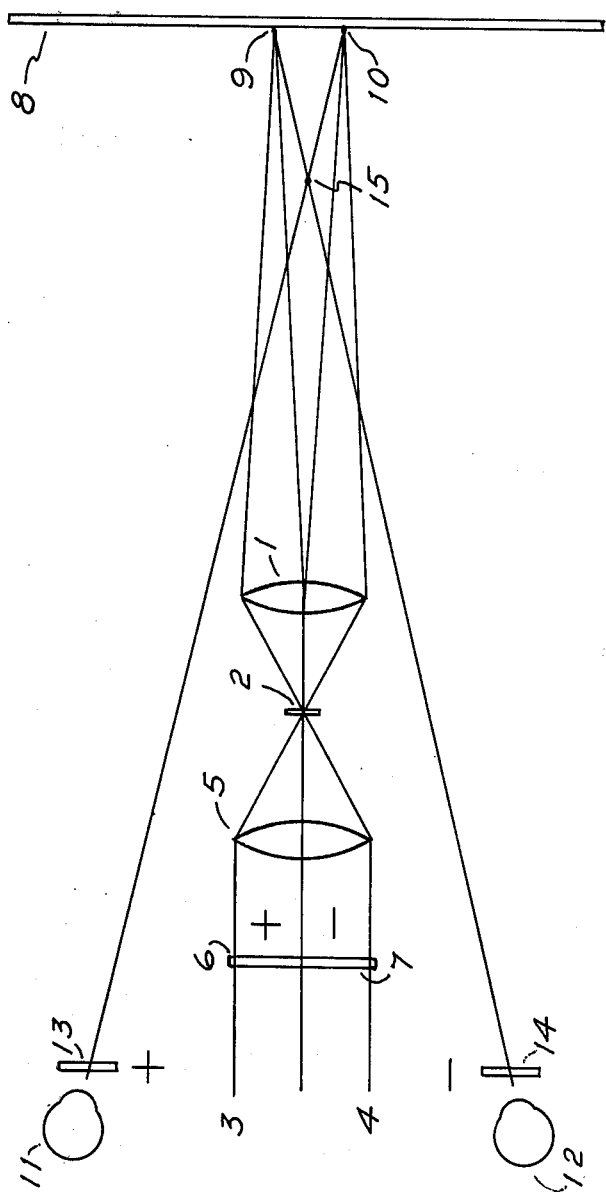
FIG. 1 is a simplified optical diagram showing the principle of the invention.

Referring, first, to FIG. 1, detail 1 represents a microscope objective at the focus of which is a specimen 2. Light rays such as those denoted by 3 and 4 from a source of illumination are focused on the specimen by the condensing lens 5. Beam-splitting filters 6 and 7 are located in the path of the light beam. The filters 6 and 7 are denoted by positive and negative symbols to indicate that they are complementary in one or the other of three different ways. Thus, they may be plane polarizers oriented with their polarizing axes mutually at right-angles. Alternatively, they may be circular polarizers, one of the pair producing left-hand polarization, the other producing right-hand polarization. As a further alternative, the filters may be complementary color filters of either the absorption or dichroic type.

The beam-splitting filters 6 and 7 in conjunction with the optical system represented by the lenses 1 and 5 segregate disparate images of each point in the specimen 2, and these images are projected on the screen 8. Two such image points are represented at 9 and 10. The image point 9 is formed by light rays transmitted by the filter 7, while the image point 10 is formed by light rays transmitted by the filter 6. The left and right eyes 11 and 12 of an observer are represented as viewing the screen 8 through filters 13 and 14 corresponding with those comprising the beam splitter. The filter 13 transmits to the observer's left eye 11 only the light which passes through the beam-splitting filter 6 and forms the image point 10, while the filter 14 transmits to his right eye 12 only the light which passes through the beam-splitting filter 7 and forms the image point 9. As a result, binocular fusion causes the observer to see a single image point in stereoscopic relief at 15, the point of intersection of his two lines of sight.

No eyepiece is included in the simplified diagram FIG. 1 as the inclusion of an eyepiece is not indigenous to the basic principle of the systems, this representing a major difference between direct viewing stereo microscopy with a binocular microscope and the projection method of the present invention. In the case of direct viewing, eyepieces are essential to enable the observer's eyes, at the exit pupils of the eyepieces, to see two virtual images of the real images formed by the objective(s). In the case of the projection method, on the other hand, the real images are materialized on a screen. However, the use of an eyepiece with this method is desirable, as this makes possible the projection of images of better quality and higher magnification. As will be understood, when the beam-splitting filters and the filters used in the viewing spectacles are of the polarizing type, the projection screen must be of a type which does not appreciably depolarize the incident light. For front projection, as represented schematically in FIG. 1, a screen consisting of a sheet of satin-finished aluminum, or of a sheet of some material which has been coated with aluminum paint, is suitable for use with either polarizing filters or color filters. For rear projection, a screen of finely etched or ground glass is suitable for use with either of these types of filters.

With regard to the location of the beam splitter, it will be understood that, if the illuminating light beam is perfectly collimated, it is immaterial where the beam splitter is placed within that beam; that is to say, it can be located with equal effectiveness at any position between the light source and the microscope substage condenser, such as, for example, immediately below the iris diaphragm with which most microscopes are equipped. In practice, however, the production of a perfectly collimated beam of light is not within the state of the art owing to the fact that there is no known method of producing a light source of indefinitely small size. For use in direct viewing microscopy, it is possible to approach perfect collimation by using a very small stop or aperture in front of the illuminant. However, for projection microscopy, where much higher levels of illumination are required, collimation must inevitably be less complete, as the stop in front of the illuminant must be increased in size so that the source of illumination becomes, in effect, an extended source. In consequence of this factor and others, further consideration must be given to the location of the beam splitter for use in the present invention.

The first point to be considered is that the correct distance of the substage condenser from the specimen, and likewise the correct opening for the condenser iris diaphragm, is governed by the focal length and numerical aperture of the particular objective in use. Hence, when the objective is changed, both the distance of the condenser from the specimen and the opening of the iris diaphragm must also be changed. Accordingly, if the beam splitter is mounted immediately below the iris diaphragm (in, for example, the filter holder usually provided in this position), the position of the beam splitter must inevitably be changed with every change of objective. This is disadvantageous except in the case of a perfectly collimated illuminating beam which, as already indicated, is unattainable.

The second point to be considered is that, with an extended light source, the optimum distance of the beam splitter from the source is independent of the distance of the condenser from the specimen. This optimum distance is governed by the nature of the emergent beam of light from the source as determined by the characteristics of the projection lens. Thus, this distance should not be changed when the distance of the condenser from the specimen is changed. In practice it is found that the most satisfactory location for the beam splitter is generally at a short distance in front of the projection lens, between the said lens and the mirror commonly provided for deflecting light into the substage condenser via the iris diaphragm.

Referring, now to FIG. 2, the drawing shows a practical system of stereo projection microscopy in accordance with the invention. Detail 16 depicts, in side elevation, a monocular microscope having a stand of the so-called L-type of construction. Detail 17 represents a screen on which the projected images are materialized. It is preferable for the height of the screen to be adjustable. A convenient method of effecting such adjustment is illustrated. Thus, the screen is rigidly supported by the upper member 18, the said upper member being slidably or "telescopically" supported in the lower member 19. After the screen has been adjusted to the correct height, it is held in that position by tightening the locking screw 20.

Light from a projection light source is transmitted by the lens 21 to the substage mirror 22. A beam-splitting filter 23 is located between the lens and the mirror, the said beam-splitting filter being represented as viewed on axis by detail 23a. The two halves of the filter are denoted by positive and negative symbols to indicate that they are either oppositely polarized or of complementary colors. The light beam is reflected upward by the mirror 22 to the housing 24 containing the iris diaphragm and substage condenser. Upon emerging from the substage condenser, the light converges on the specimen 25 and then, as a divergent beam, enters the objective 26. Due to the action of the beam splitter 23, this divergent beam comprises left-eye and right-eye aspects of the specimen 25, these different aspects being characterized by being formed by two different kinds of light as determined by the nature of the beam-splitting filters. Thus, the two different aspects may comprise light which is oppositely polarized or of complementary colors.

After emerging from the objective 26, the light beam traverses the internal optical system of the microscope and enters the housing 27, one end of which is inserted in the eyepiece tube 28. The housing 27 contains a prism of known type by which the light is deflected downward through an angle of 45° degrees so that it is projected to the screen 17 via the eye-piece 29 which is inserted in the other end of the housing 27. The projected images are seen stereoscopically when viewed binocularly by an observer 30 through complementary filters represented at 31 corresponding with those comprising the beam splitter. For the sake of clarity the binocular viewing filters are also represented as viewed on axis at 31a and 31b. If the filters 23 and 31 are of the polarizing type, the screen 17 must be of the nondepolarizing type as hereinbefore indicated.

When the filters used in the beam splitter and in the viewing spectacles are of the complementary color type, due attention to the color(s) of the specimen must be given in order that the most satisfactory pair of colors may be selected for the said filters. The choice is limited to three possible pairs of colors: (1) the additive primary, red, together with the subtractive primary, cyan, (2) the additive primary, blue, together with the subtractive primary, yellow, and (3) the additive primary, green, together with the subtractive primary, magenta. The important point to be noted when selecting the filters is that neither of the two colors chosen should match, or be approximately the same as, the predominant color of the specimen. For example, if the specimen is predominantly red, the best possible choice for the colors of the filters in the beam splitter and the viewing spectacles is the additive primary, blue, together with the subtractive primary, yellow.

(2) Stereo Photomicrography

The basic arrangement represented in FIG. 2 is readily adaptable to stereo photomicrography. For this purpose the screen 17 is replaced by a photosensitive film or plate. As in the case of regular or planoscopic photomicrography, it is preferable, although not essential, for the said film or plate to be supported at the focal plane of a camera. Again as in the case of regular photomicrography, the camera may be equipped with a lens or, alternatively, the imagery emerging from the microscope eyepiece may be projected direct to the photosensitive surface without the use of a camera lens. The photographic apparatus is not illustrated, as various suitable types of equipment are known. Four different systems of stereo photomicrography come within the scope of the invention:

(a) The left-eye and right-eye images are projected simultaneously on color film. Segregation of the left-eye and right-eye images is accomplished by the use of a beam splitter comprising complementary color filters located in the path of the light beam by which the specimen is illuminated. The photomicrograph is processed and then viewed binocularly through complementary color filters corresponding with those incorporated in the beam splitter.

(b) The left-eye and right-eye images are projected simultaneously on film of the type (such as that known as Vectograph film) on which a pair of oppositely polarized images can be recorded in superposition. Segregation of the left-eye and right-eye images is accomplished by the use of a beam splitter comprising oppositely polarizing filters located in the path of the light beam by which the specimen is illuminated. The photomicrograph is processed and then viewed binocularly through polarizing filters corresponding with those incorporated in the beam splitter.

(c) Two sequential exposures are made, one for the left-eye view and one for the right-eye view, using a separate piece or frame of film for each exposure. The film may be of either the black-and-white or color type.

Complementary color filters are used in the beam splitter. During each of the two exposures, a color filter corresponding with one of those in the beam splitter is interposed in the beam of light emerging from the microscope so that, during one exposure, only the left-eye view is recorded on the film and, during the other exposure, only the right-eye view is recorded. The photomicrographs are processed, resulting in the production of the two components of a simple stereogram or stereo pair which is then viewed in a stereoscope or by other susitable means.

(d) This system is similar to (c) above except that in this case the color filters in the beam splitter and those interposed in the beam of light emerging from the microscope are replaced by appropriately oriented polarizing filters.

3. Stereo Television

As already indicated under (2) above, the basic arrangement represented in FIG. 2 is readily adaptable to stereo photomicrography. similarly, the said basic arrangement is readily adaptable to the transmission of stereo microscopic images by television. For this purpose the screen 17 in FIG. 2 is replaced by a color television camera arranged to pick up the imagery emerging from the microscope eyepiece. It is considered unnecessary to illustrate the camera as many suitable types are known. The beam-splitting filters represented at 23 and 23a in FIG. 2 are of the complementary color type in this case, in consequence of which the imagery received on the photosensitive surface of the television camera is of the anaglyphic type. This imagery is transmitted by radio or cable in known manner to a color television receiver or monitor the picture screen of which is viewed binocularly through complementary color filters corresponding with those in the beam splitter.

The invention having been fully described, it is understood that it is not to be limited to the details herein set forth, but is of the full scope of the appended claims.

What is claimed is:

1. A stereo microscopic projection system comprising the following elements: a monocular microscope for examining a specimen; a substage condenser included in the microscope on one side of the plane of support of the specimen; and objective lens included in the microscope on the other side of the plane of the specimen; a light source positioned to direct a beam of light through said substage condenser, said beam being converged by said substage condenser in the plane of support of the specimen for illuminating the specimen, and said beam entering said objective lens as a divergent beam; a beam splitter comprising complementary filters located in the light path between the light source and the substage condenser, said beam splitter causing said divergent beam to comprise two disparate aspects of the specimen to cause said objective lens to produce a pair of disparate images of the specimen; and means on which the disparate images are materialized.

2. A stereo microscopic projection system according to claim 1, in which the filters in the beam splitter are of the complementary color type.

3. A stereo microscopic projection system according to claim 2, in which the complementary color filters are of the absorption type.

4. A stereo microscopic projection system according to claim 2, in which the complementary color filters are of the dichroic type.

5. A stereo microscopic system according to claim 1, in which the filters in the beam splitter are of the polarizing type.

6. A stereo microscopic projection system according to claim 1, in which said last-named means comprises a photosensitive surface on which the said images are recorded.

7. A stereo microscopic projection system according to claim 6, in which the filters in the beam splitter are of the complementary color type, and in which said photosensitive surface contains color sensitive material on which the two disparate images are simultaneously recorded.

8. A stereo microscopic projection system according to claim 6, in which the filters in the beam splitter are of the polarizing type, the planes of polarization of the two filters being mutually perpendicular, and in which the photosensitive surface is a photographic film of the type on which a pair of oppositely polarized images can be recorded in superposition.

9. A stereo microscopic projection system according to claim 6, in which the filters in the beam splitter are of the complementary color type, and in which the two disparate images are recorded sequentially on separate pieces or frames of photosensitive material, the first photographic exposure being made through a color filter corresponding with one of the two color filters in the beam splitter, and the second photographic exposure being made through a color filter corresponding with the other one of the two color filters in the beam splitter, thereby producing a stereoscopic pair of photomicrographs.

10. A stereo microscopic projection system according to claim 2, in which said last-named means comprises the photosensitive surface of a color television camera.

* * * * *